US010389770B2

(12) United States Patent
Pogorelik

(10) Patent No.: US 10,389,770 B2
(45) Date of Patent: Aug. 20, 2019

(54) CONCURRENT NETWORK BASED COLLABORATION SESSIONS

(71) Applicant: Intel Corporation, Santa Clara, CA (US)

(72) Inventor: Oleg Pogorelik, Lapid (IL)

(73) Assignee: Intel Corporation, Santa Clara, CA (US)

(*) Notice: Subject to any disclaimer, the term of this patent is extended or adjusted under 35 U.S.C. 154(b) by 635 days.

(21) Appl. No.: 15/079,754

(22) Filed: Mar. 24, 2016

(65) Prior Publication Data

US 2017/0279859 A1    Sep. 28, 2017

(51) Int. Cl.
*H04L 12/00* (2006.01)
*G06F 13/00* (2006.01)
*H04L 29/06* (2006.01)
*G06F 3/0481* (2013.01)
*G06F 3/0482* (2013.01)

(52) U.S. Cl.
CPC ......... *H04L 65/403* (2013.01); *G06F 3/0482* (2013.01); *G06F 3/04817* (2013.01); *H04L 65/1066* (2013.01); *H04L 65/1069* (2013.01); *H04L 65/1089* (2013.01); *H04L 65/1093* (2013.01); *H04L 65/4015* (2013.01)

(58) Field of Classification Search
CPC ............. H04L 65/1066; H04L 65/1089; H04L 65/1069; H04L 65/1093; H04L 10/93; H04L 65/4015; G06F 3/04817; G06F 3/0482
USPC .................. 709/204, 205, 206, 207; 707/608
See application file for complete search history.

(56) References Cited

U.S. PATENT DOCUMENTS

| 8,312,081 B2* | 11/2012 | Yuan ....................... H04L 67/22 379/202.01 |
| 9,946,992 B2* | 4/2018 | Beerse ................. G06Q 10/109 |
| 2002/0049786 A1* | 4/2002 | Bibliowicz ........... G06F 3/0481 715/211 |

(Continued)

FOREIGN PATENT DOCUMENTS

| JP | 0738870 | 2/1995 |
| JP | 07105106 | 4/1995 |
| WO | 2017165052 | 9/2017 |

OTHER PUBLICATIONS

"International Application Serial No. PCT US2017 018890, International Preliminary Report on Patentability dated Oct. 4, 2018", 8 pgs.

(Continued)

*Primary Examiner* — Frantz Coby
(74) *Attorney, Agent, or Firm* — Schwegman Lundberg & Woessner, P.A.

(57) ABSTRACT

Disclosed in some examples are computer systems, methods, and machine readable mediums which provide for concurrent instances of network based collaboration sessions. Media that is shared in a collaboration session may be termed blocking media or unblocking media. The active session presents both the blocking and non-blocking media. Only non-blocking media is presented in the background sessions. Thus, for example, the audio, video, or all the media may be presented in the active session, and only the non-blocking media such as a text chat may be presented in one or more background sessions. Users may switch which collaboration session is active and which collaboration sessions are background sessions.

24 Claims, 11 Drawing Sheets

(56) References Cited

U.S. PATENT DOCUMENTS

| | | | |
|---|---|---|---|
| 2007/0198744 A1* | 8/2007 | Wensley | H04L 12/1827 709/248 |
| 2009/0055483 A1* | 2/2009 | Madan | G06Q 10/10 709/206 |
| 2012/0262533 A1 | 10/2012 | Gannu et al. | |
| 2013/0162756 A1* | 6/2013 | Ellison | H04L 65/403 348/14.08 |
| 2013/0339847 A1* | 12/2013 | Bartek | G06Q 10/10 715/255 |
| 2014/0078240 A1 | 3/2014 | Yang | |
| 2015/0022625 A1 | 1/2015 | Thapa | |
| 2017/0109120 A1* | 4/2017 | French | G06F 17/50 |

OTHER PUBLICATIONS

"International Application Serial No. PCT/US2017/018890, International Search Report dated May 23, 2017", 3 pgs.
"International Application Serial No. PCT/US2017/018890, Written Opinion dated May 23, 2017", 6 pgs.

* cited by examiner

US 10,389,770 B2

CONCURRENT NETWORK BASED COLLABORATION SESSIONS

TECHNICAL FIELD

Embodiments pertain to an improved computing device for providing concurrent network based collaboration sessions. Some embodiments relate to improved computing devices for facilitating multiple online communications simultaneously.

BACKGROUND

Network based collaboration systems allow users to engage in collaboration sessions in which they share content in real time (or near real time) with other users to facilitate communication and collaboration. Example content includes a desktop view of a host computer, text (e.g., a text chat), voice (e.g., from microphones or a telephone line) and video (e.g., from a video phone or web camera).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
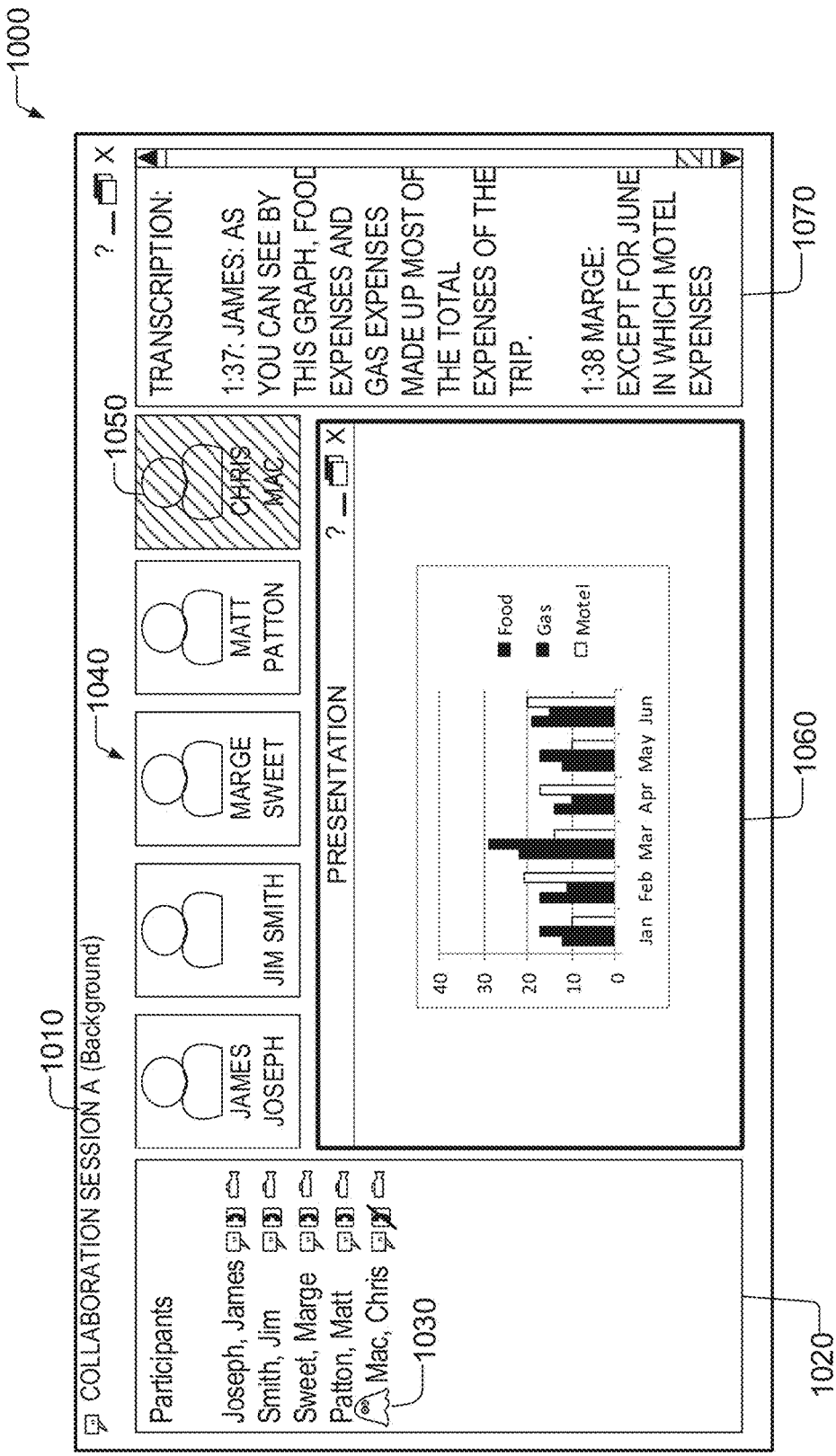
FIG. 1 shows a diagram of an example GUI screen of a collaboration application of a background collaboration session according to some examples of the present disclosure.

The network based collaboration systems allow for individuals around the world to share content with each other through collaboration sessions. Example collaboration sessions include online meetings, voice over IP phone calls, video calls, instant messaging, chats, and the like. For example, users may share a slideshow presentation, contents of their computing screen, voice, video and the like through a Graphical User Interface (GUI) provided by a collaboration application on their collaboration devices (e.g., computing devices). The collaboration applications may share information directly with each other in a Peer-to-Peer model, or may communicate with a collaboration server which relays the shared media between connected collaboration applications within the same collaboration session. Example collaboration systems include GOTOMEETING®, SKYPE®, GOOGLE HANGOUTS®, and the like.

Individuals involved in collaborative roles (e.g., developers, managers, consulting experts, field support, and the like) may be invited to multiple collaboration sessions during a day, with some of the invitations overlapping in time with each other. Currently, an individual with multiple collaboration sessions is expected to accept only one session and decline the others.

Disclosed in some examples are computer systems, methods, and machine readable mediums which provide for concurrent network based collaboration sessions. Media that is shared in a collaboration session may be termed blocking media or unblocking media. Blocking media is a type of media that would not be capable of being distinguishable by, or would be confusing to, an average user if two streams of blocking media from two different collaboration sessions are presented concurrently. One example of blocking media is audio, including one way or two way audio communications such as a conversation or music. If the audio from one collaboration session were mixed with the audio from another collaboration session, the crosstalk would be confusing to an average user. Another example blocking media may be video. Non-blocking media is media from a first collaboration session that can be concurrently presented with non-blocking media from a second collaboration session and would be distinguishable by, and would not confuse, an average user. Example non-blocking media includes pictures, slideshows, text, and the like.

In the improved network based collaboration system that supports concurrent instances of network based collaboration sessions, a first collaboration session is termed an active session and one or more other collaboration sessions are termed background sessions. The active session presents both the blocking and non-blocking media and is the default destination session for media sharing (e.g., the default destination for output of a microphone for sharing audio). Only non-blocking media is presented in the background sessions. Thus, for example, the audio, video, or all the media may be presented in the active session, and only the non-blocking media such as a text chat may be presented in one or more background sessions. Additionally, as noted, the active session may be the default session to which media such as audio is shared by the user. For example, the microphone audio of a computer microphone or a phone microphone may be shared with the active session and may not be shared with the background sessions unless specifically designated by the user. For example, the user's audio may be muted on the background sessions but live on the active session. Thus, the user is actively listening, discussing, and collaborating in the active session, but still monitoring the background sessions. Users may switch which collaboration session is active and which collaboration sessions are background sessions.

By missing information conveyed through the blocking media (e.g., an audio conversation), the participant engaged in concurrent collaboration sessions may miss important details in the background collaboration sessions. To avoid this, blocking media from the background sessions may be converted into a form of unblocking media. For example, the audio conversation may be transcribed in real time and displayed in a GUI window of the collaboration application associated with the background sessions. The user may scroll the real time transcript to monitor the background session. Additionally, the blocking media from the background sessions may be stored and when the collaborator switches a background collaboration session to be the active session, the user may have the opportunity to have all or a portion of the stored blocking media presented to the collaborator. For example, the last ten seconds of audio may be played to the collaborator.

As previously noted, a user may switch which collaboration sessions are background sessions and which is the active session. This may be done by one or more of: changing the input focus (e.g., by selecting a GUI window of a background session to a window that is "in-focus" in the GUI), activating a button on a GUI window of the first or second collaboration sessions, activating a button on a control panel, or the like.

In some examples, various content triggers may automatically make a background collaboration session active, or alert a collaborator that their presence is beneficial in a background collaboration session. For example, the members of a collaboration session may signal to a collaborator that is monitoring the collaboration session in the background that their active presence is needed by using one or more implicit or explicit triggers. Example explicit triggers may include pressing a button on their collaboration software designed for this purpose, saying a known keyword or keyphrase that is detected by the collaboration software, typing a known keyword, or the like. For example, "Attention!", or the person's name "Jim." Example implicit triggers may include the active participant saying, typing, or otherwise communicating a keyword or keyphrase that may be predetermined by the collaborator that is monitoring the collaboration session in the background. For example, the collaborator may enter keywords or keyphrases of a topic of interest where they may have information to contribute. If the other collaborators in the session communicate one of these keywords or keyphrases, the collaborator who is monitoring this session in the background may be alerted. Other example triggers include a time, an incoming message, and the like.

In some examples, detection of an implicit or explicit trigger may automatically switch the background collaboration session to be the active session, but in other examples it merely creates an attention grabbing signal on the collaboration software. For example, a flashing prompt or a sound designed to alert the collaborator that their presence is requested in a background collaboration. This prompt may be displayed anywhere on the collaboration device, for example, in a GUI window of either the first or second collaboration session.

By allowing for concurrent collaboration sessions in this way, users are able to decrease the instances of scheduling conflicts and increase the rate of collaboration.

Turning now to FIG. 1 an example GUI screen 1000 of a collaboration application of a background collaboration session is shown according to some examples of the present disclosure. A title bar 1010 shows an application icon, a title of the collaboration session ("COLLABORATION SESSION A"), an indicator of whether this is the background or the active collaboration session ("(Background)") and one or more windowing icons. A participants list is shown at 1020 with names of participants in the network based collaboration session. Participants have a list of icons next to their names indicating which forms of media they are capable of sending or receiving. Examples include voice (a phone icon), video (a video recorder icon) and chat ("a text icon"). Additionally, if the user is monitoring this collaboration session in the background, an indication of that (a background status icon) may be displayed next to their name. In the example of FIG. 1, background status icon 1030 is a ghost icon. Additionally, the phone icon indicates that this user is not receiving audio by use of a slash through the phone.

Picture elements 1040 may contain a picture of each of the participants as well as their names. The pictures of participants who are monitoring this collaboration session in the background may be greyed out or otherwise indicated as monitoring this collaboration session in the background. In the example of FIG. 1, the participant is greyed out 1050. At 1060 the non-blocking media that is being shared is presented. In the example of FIG. 1, it is a presentation. At 1070 the transcription panel is displayed which displays a transcription of the audio—thus presenting a non-blocking view of the blocking media. The GUI presented by FIG. 1 is that displayed by the collaboration application of the user that is participating as a background session. For example, Chris Mac's collaboration application. However, other participants would have a similar GUI, but may not see the transcription panel if they are actively participating. For example, they would still see the background status icon 1030, and greyed out image 1050.

Figure 2:
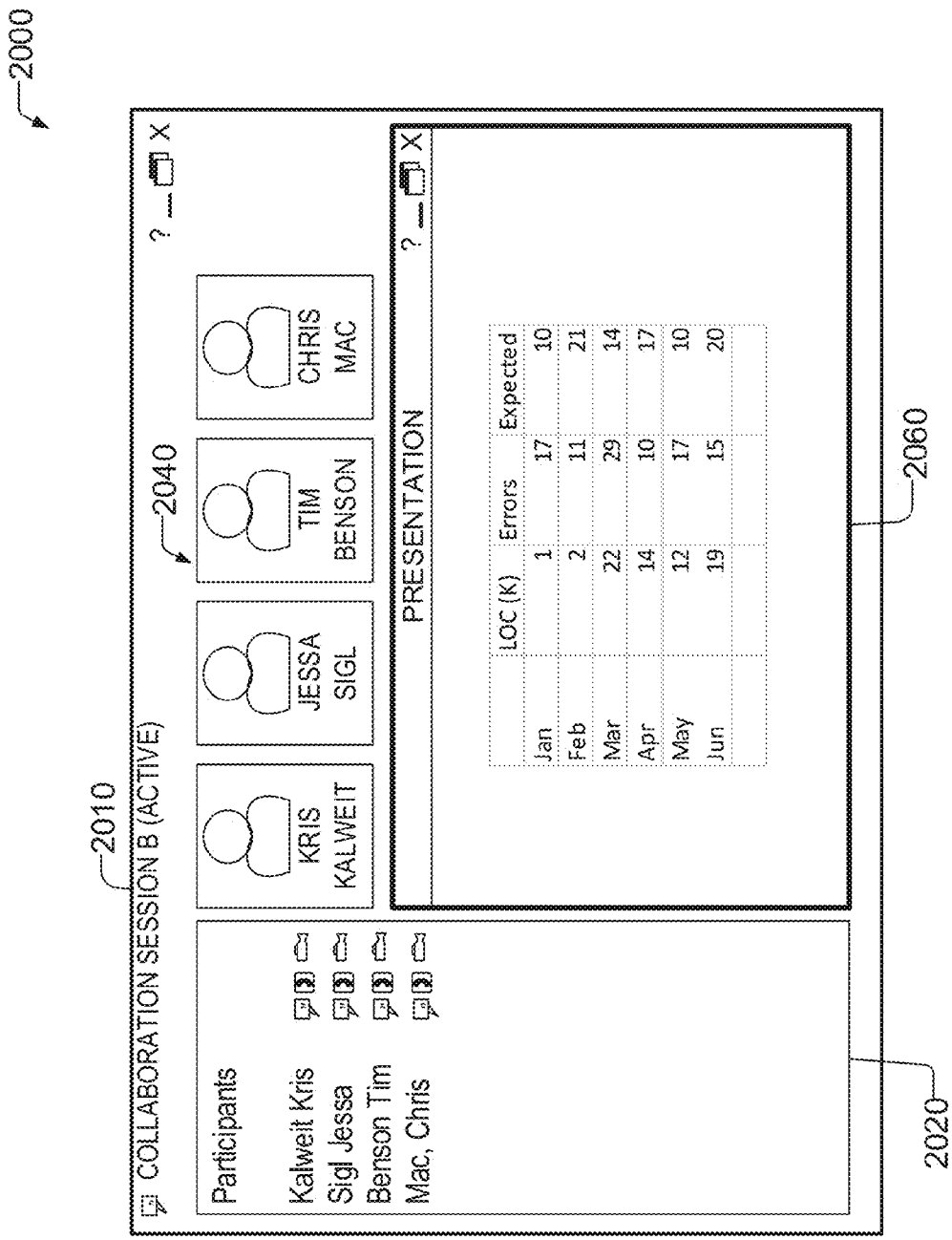
FIG. 2 shows a diagram of an example GUI screen of a collaboration application of an active collaboration session according to some examples of the present disclosure.

Turning now to FIG. 2 an example GUI screen 2000 of a collaboration application of an active collaboration session is shown according to some examples of the present disclosure. A title bar 2010 shows an application icon, a title of the collaboration session ("COLLABORATION SESSION B"), an indicator of whether this is the background or the active collaboration session ("(ACTIVE)") and one or more windowing icons. A participants list 2020 with names of participants in the network based collaboration session. Participants have a list of icons next to their names indicating which forms of media they are capable of sending or receiving. Examples include voice (a phone icon), video (a video recorder icon) and chat ("a text icon"). Additionally, if the user is monitoring this collaboration session in the background, an indication of that (a background status icon) may be displayed next to their name. In the example of FIG. 2, all participants are active participants, so no icon is displayed.

Picture elements 2040 may contain a picture of each of the participants as well as their names. The pictures of participants who are monitoring this collaboration session in the background may be greyed out or otherwise indicated as monitoring this in the background. In the example of FIG. 2, nobody is greyed out as all participants are active. At 2060 the media that is being shared is presented. In the example of FIG. 2, it is a presentation. Additionally, media shared by the user would be shared through the active collaboration session—for example, audio input into a microphone of the presentation device may be shared by default with the active collaboration session.

Figure 3:
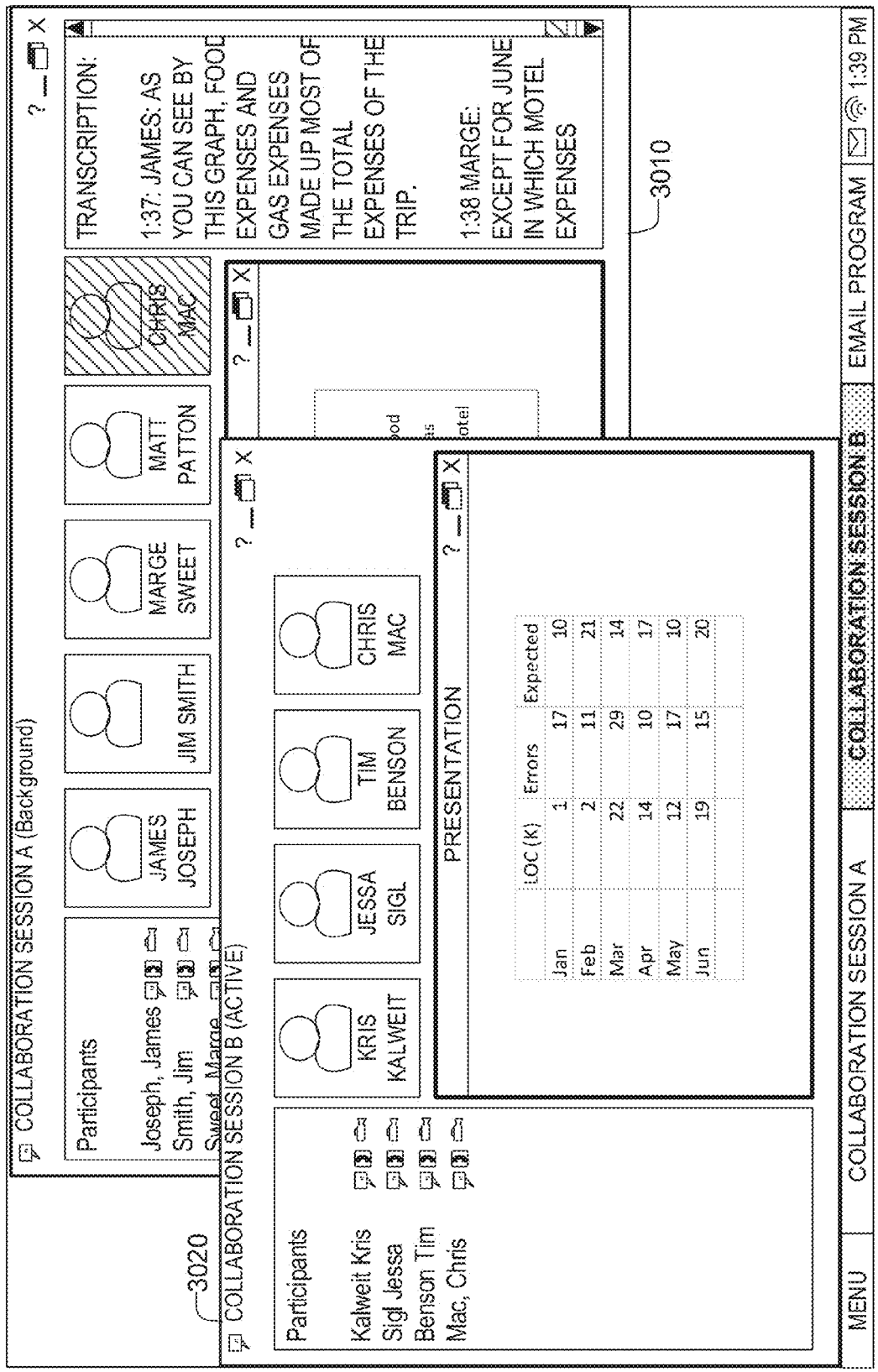
FIG. 3 shows a diagram of a GUI desktop provided by an operating system of a computing device running collaboration sessions of FIGS. 1 and 2 according to some examples of the present disclosure.

Turning now to FIG. 3, a view of a GUI desktop provided by an operating system of a computing device running collaboration sessions of FIGS. 1 and 2 is shown according to some examples of the present disclosure. Window 3010 is a background session of FIG. 1, and window 3020 is an active collaboration session of FIG. 2. Each GUI window may be created and maintained by the same or a separate instance of the collaboration application. Collaboration session B is the currently active collaboration session and has the input focus.

Figure 4:
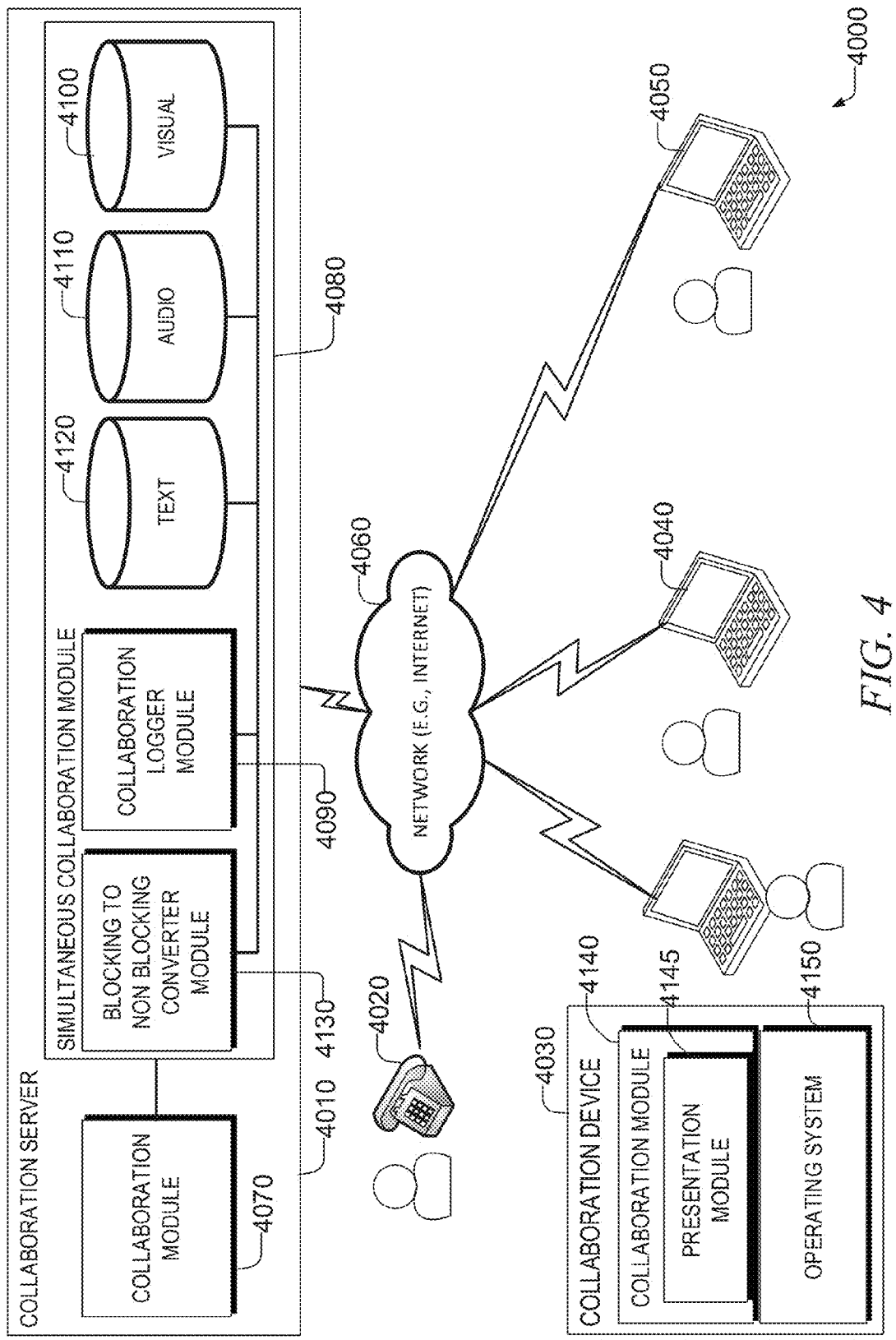
FIG. 4 shows an example schematic of a network based collaboration system according to some examples of the present disclosure.

Turning now to FIG. 4, an example schematic of a network based collaboration system 4000 is shown according to some examples of the present disclosure. Collaboration system 4000 includes collaboration server 4010, and one or more collaboration devices 4020, 4030, 4040, and 4050. Example collaboration devices include computing devices, such as a desktop computer, laptop computer, tablet computer, smartphone, and the like. Other example collaboration devices include a telephone or cellphone. Collaboration devices 4020, 4030, 4040, and 4050 are connected to collaboration server 4010 through network 4060. In some examples, collaboration devices, such as a telephone may be connected to collaboration server 4010 through a telephone network. Information and media presented (e.g., streamed, spoken, shared, and the like) from one of the collaboration devices 4020, 4030, 4040, and 4050 in a collaboration session is sent to the collaboration server 4010. Collaboration module 4070 then routes this information to one or more of the other collaboration devices 4020, 4030, 4040, and 4050 participating in the collaboration session to share this information and media. Collaboration module 4070 also sets up, tears down, and maintains the collaboration session, as well as provides metadata (e.g., who is in the collaboration session and their status) to the collaboration devices 4020, 4030, 4040, and 4050.

Simultaneous collaboration module 4080 provides concurrent collaboration session services to the collaboration devices 4020-4050. Collaboration logger module 4090 may log and store media presented in the collaboration sessions in various data stores. For example, text collaborations may be stored in a text data store 4120. Audio may be stored in audio data store 4110 and videos or other visual components (such as screen sharing) may be stored in the visual data store 4100. This allows collaborators to review portions of the collaboration session after the session. In other examples, this allows for playback of a portion of a background collaboration session just after or just prior to a user making the background session an active session. Blocking to non-blocking converter module 4130 may read media stored in one of the data stores 4100-4120 and if it is blocking, convert it to non-blocking media and send the non-blocking media to collaboration devices which are monitoring the corresponding collaboration session in the background. The non-blocking version of the media may also be stored in one of the data stores 4100-4120.

For example, the blocking to non-blocking converter module 4130 may take audio (speech conversation, for example) and use speech-to-text functionality and convert the audio into speech. As another example, the audio component of a video may be converted to text, and the video component may be converted into a series of one or more still frame images. The still frame image may be changed when the difference between the newest received video frame and the last displayed still frame image exceeds a predetermined threshold. This threshold may be configurable by a user to ensure that the video is understandable, but at the same time not distracting. These still frame images may be reviewable by the user—for example using playback controls. Additionally, the unaltered video may be replay able by the user.

In some examples, collaboration module 4070 may monitor the transcript generated by the blocking to non-blocking converter module 4130 to detect one or more triggers that indicate that a collaboration session should be made active. Collaboration module 4070 may signal the collaboration device 4020, 4030, 4040, or 4050 corresponding to the collaborator that the trigger is directed to so that the collaboration device 4020, 4030, 4040, or 4050 can notify the user of the detection of the trigger. Collaboration module 4070 may also receive information from a collaboration device 4020, 4030, 4040, or 4050 that a particular session was changed from active to background and from background to active. Collaboration module 4070 may then update the meta data of each collaboration session to reflect this transition. For example, collaboration module 4070 may send an update to the collaboration devices 4020, 4030, 4040, or 4050 to display, or remove from display the background status icon. The collaboration server 4010 may have other modules that are not shown for clarity, such as an operating system, and other applications. The functions performed by the logical modules are exemplary and one or more of the functions of any of the logical modules in FIG. 4 may be performed by different logical modules than described, or may be performed by logical modules not shown in FIG. 4.

Collaboration devices, such as collaboration device 4030 may have a collaboration module 4140. Collaboration module 4140 may communicate with collaboration server 4010 to send media shared by the collaborator operating the collaboration device 4030 and to receive media shared by other collaborators in one or more collaboration sessions. Collaboration module 4140 may include a presentation module 4145 that may provide one or more Graphical User Interfaces (GUIs). Example GUIs may include the GUIs of FIGS. 1, 2, and 3. Upon selection of, or a change of, the active collaboration session, collaboration module 4140 may signal the collaboration server 4010 that the user wishes to switch which collaboration session is the active session and which sessions are the background sessions. Collaboration device 4030 may also cause the presentation module 4145 to present one or more notifications to the user responsive to receiving an indication from the collaboration server 4010 that a triggering event has occurred, or in response to detecting the triggering event. For example, the collaboration server 4010 or the collaboration modules on collaboration device 4020, 4030, 4040, or 4050 may detect one or more defined keywords or keyphrases in a background collaboration session. In response to the detection of one or more keywords or keyphrases, (or in response to a notification from the collaboration server 4010 in examples in which the collaboration server 4010 detects the keywords) the collaboration device 4020, 4030, 4040, or 4050 may display a notification to the user that their presence is requested in a background session. This notification may be displayed anywhere on the collaboration device 4020, 4030, 4040, or 4050, including the active or background collaboration session GUIs.

Collaboration devices 4020, 4030, 4040, or 4050 may also have an operating system 4150 which manages the hardware of the collaboration device 4020, 4030, 4040, or 4050 and provides one or more services for the collaboration client 4140. For example, the operating system 4150 may provide a GUI desktop interface and may provide application windowing services for the GUIs provided by the collaboration client 4140. Presentation module 4145 may work with operating system 4150 to provide the various collaboration GUIs. Operating system 4150 may also provide input and other information to the collaboration client 4140. For example operating system 4150 may provide information on which window is in-focus. This may be used by the collaboration client 4140 to determine which GUI is in focus and which collaboration session should be active in examples where the GUI that is in focus is the active collaboration session. The modules of the collaboration device 4020, 4030, 4040, or 4050 are exemplary and the collaboration device may have other modules such as other applications which are not shown.

Figure 5:
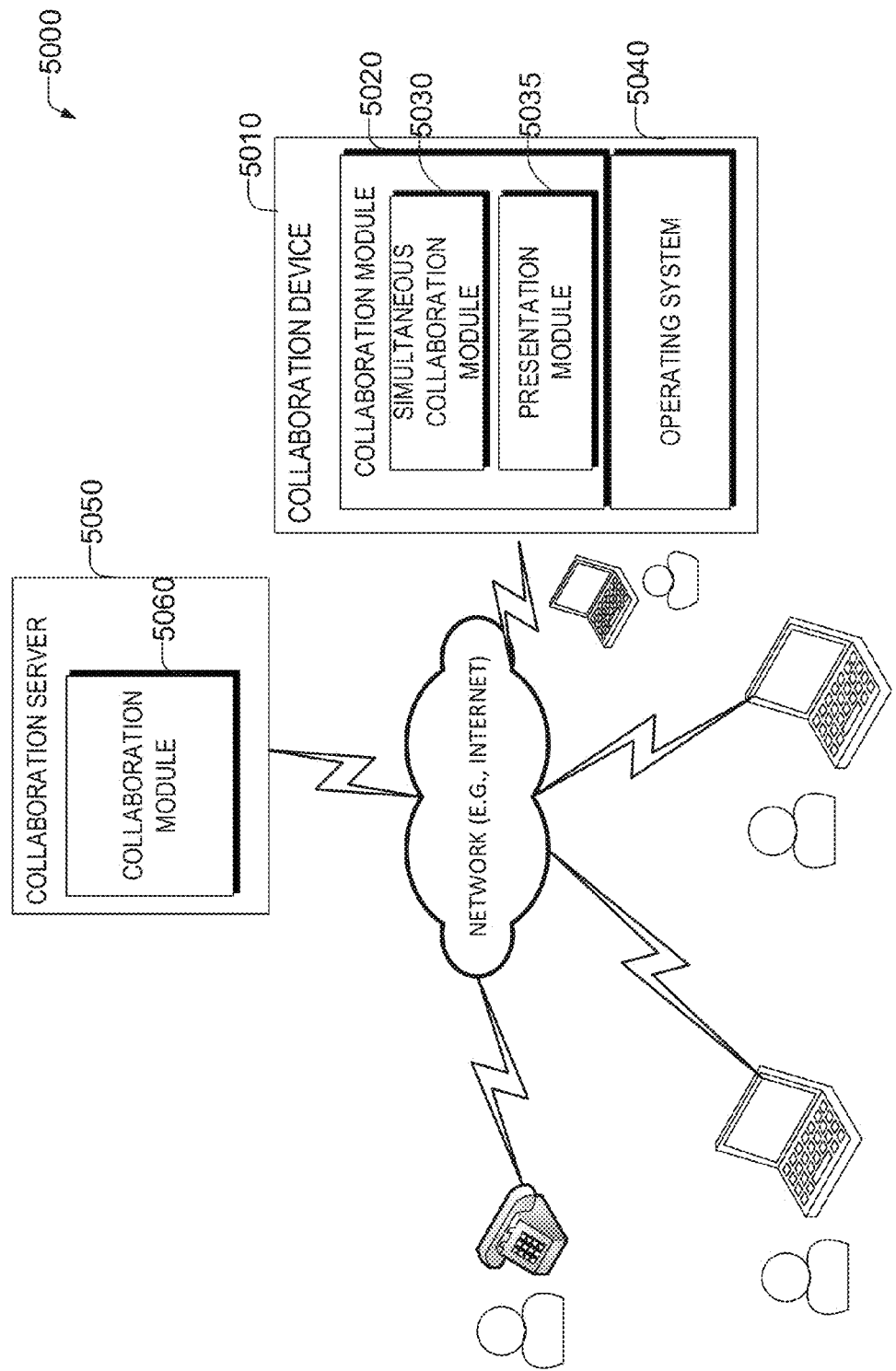
FIG. 5 shows a schematic of a network based collaboration system according to some examples of the present disclosure.

Turning now to FIG. 5, an example schematic of a network based collaboration system 5000 is shown according to some examples of the present disclosure. In the example system of FIG. 5, the simultaneous collaboration module 5030 has been moved from the collaboration server 5050 to the collaboration device 5010. Collaboration device 5010 includes the collaboration module 5020 which provides the functions of collaboration module 4140 of FIG. 4, but includes the functions of the simultaneous collaboration module 4080 of FIG. 4, such as the blocking to non-blocking converter module 4130, collaboration logger module 4090, and in some examples data stores 4100-4120. Operating system 5040 may provide the services and functionality of operating system 4150 of FIG. 4. Presentation module 5035 may provide the services and functionality of presentation module 4145 of FIG. 4. Similarly, collaboration module 5060 may provide the services and functionality of collaboration module 4070 of FIG. 4. While two combinations of the locations of various functions of the system are shown in FIGS. 4 and 5, one of ordinary skill in the art with the benefit of this disclosure will appreciate that other configurations and combinations are possible.

Figure 6:
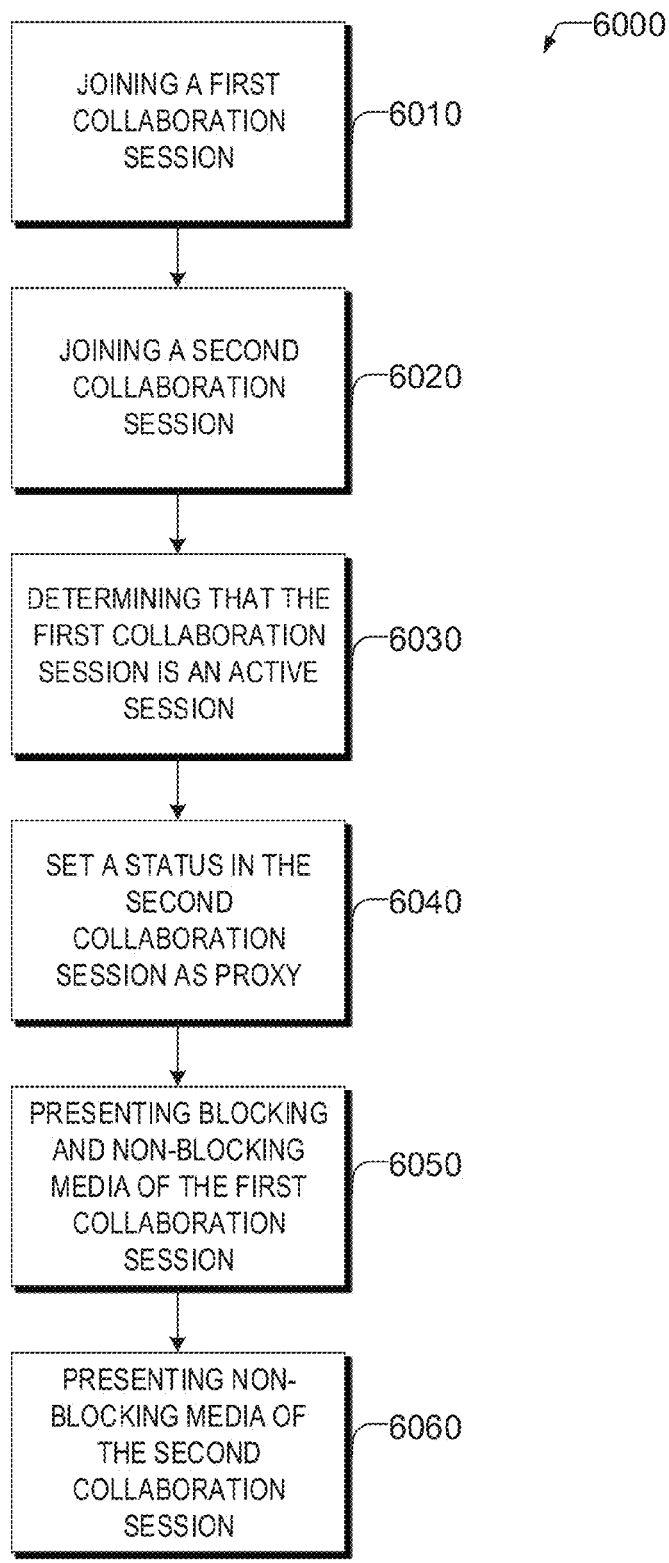
FIG. 6 shows a flowchart of a method of providing concurrent collaboration sessions according to some examples of the present disclosure.

Turning now to FIG. 6, a flowchart of a method 6000 of providing concurrent collaboration sessions is shown according to some examples of the present disclosure. At operation 6010, the collaboration device may join a first collaboration session. For example, the collaboration device may connect with the collaboration server over a network and join the collaboration session. At operation 6020, the collaboration device may join a second collaboration session. At operation 6030, the collaboration device may determine that the first collaboration session is an active session and the second collaboration session is a background session. For example, the user may designate which of two concurrent collaboration sessions is a background session and which is an active session. In other examples, the first collaboration session joined may default to the active session, or vice versa. At operation 6040, the collaboration device may set a status in the second collaboration session informing other members of the collaboration that this is a background collaboration session for this user. This may be the result of the collaboration device sending an indication to the collaboration server that the second collaboration session is a background session. The collaboration server than forwards this indication to other collaboration devices participating in the collaboration session. This status indicates to other collaboration devices that particular users may be only monitoring the collaboration session in the background. These other collaboration devices may display background icons to indicate to their users the users that are monitoring the session in the background.

At operation 6050, the collaboration device may present the blocking and non-blocking media of the first collaboration session. The media may be sent by other collaborators and received through the collaboration server. The collaboration device may also share blocking and non-blocking media in the active collaboration session by sending it to the collaboration server. For example, audio output from a microphone communicatively coupled to, or integrated with the collaboration device. At operation 6060, the non-blocking media of the second collaboration session is presented. This non-blocking media may comprise a conversion of at least one item of blocking media to an item of non-blocking media. For example an audio conversation may be transcribed to a textual transcript that may be presented. In some examples the collaboration server may transcribe the audio, but in other cases the collaboration device may transcribe the audio. The collaboration device may also share blocking and non-blocking media with the second collaboration session by sending it to the collaboration server. In some examples, the second collaboration session may present only the non-blocking media and may not present the blocking media (unless converted to non-blocking media).

Figure 7:
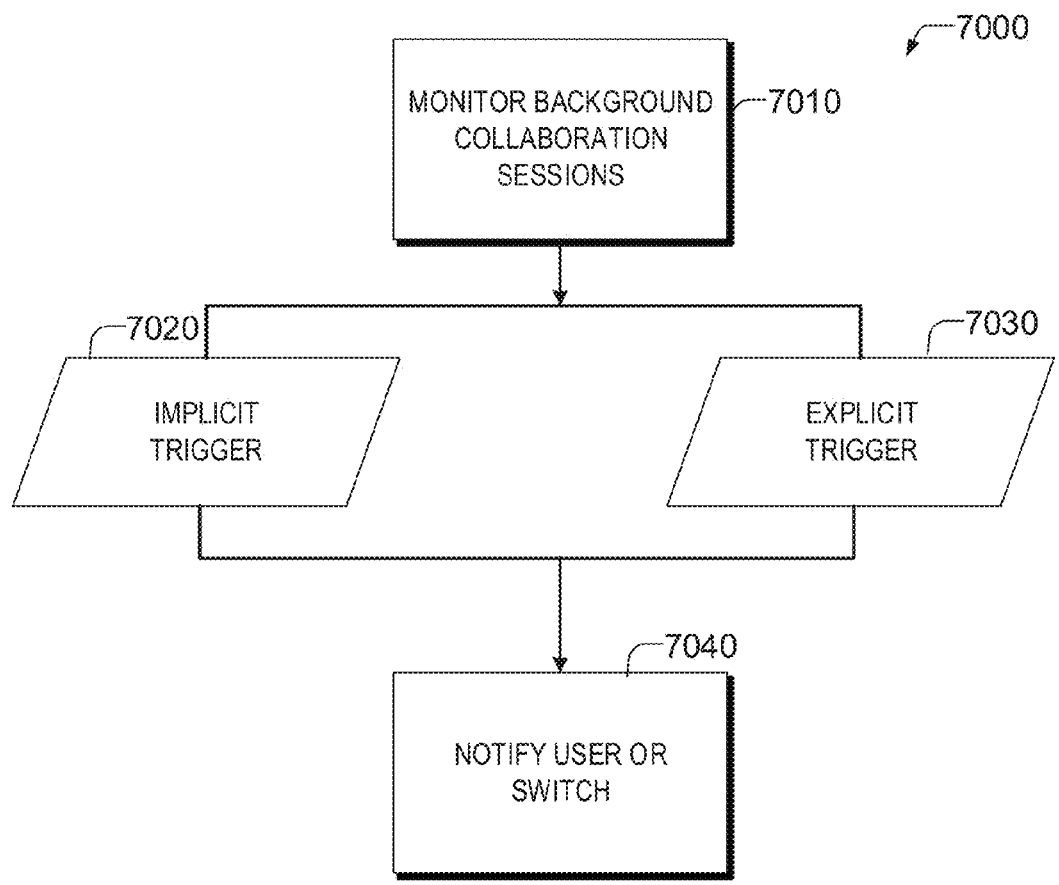
FIG. 7 shows a flowchart of a method of monitoring a background session for an implicit or explicit trigger, according to some examples of the present disclosure.

FIG. 7 shows a flowchart of a method 7000 of monitoring a background session for an implicit or explicit trigger, according to some examples of the present disclosure. At operation 7010, the system monitors the background collaboration sessions for an implicit trigger 7020 or explicit trigger 7030. Example implicit triggers include keywords or keyphrases that are determined in advance by the user that is monitoring this collaboration session as a background session. These keywords or keyphrases may be detected by scanning the transcript of the audio for these words or phrases. Other example implicit triggers include the presentation of a particular piece of media, a time elapsed since the start of the collaboration session, an absolute time, and the like. Example explicit triggers include the activation of one or more buttons or controls by active users of the collaboration session requesting the active presence of a background collaborator. Other explicit triggers include certain keywords or keyphrases that all participants are aware of. For example, the collaboration application may tell users that to signal that a background user's presence is requested, that they are to say their name, or to say a keyword such as "attention!" Thus, the explicit keywords or keyphrases may be dynamic (e.g., a user's name) or static ("attention!").

In some examples, the monitoring may be done on the collaboration server. For example, the collaboration module may monitor the transcript of the audio conversation for one or more keywords or keyphrases. In examples where the collaboration server monitors for the trigger words, the collaboration device may send the user determined trigger words to the collaboration server. In other examples, the monitoring may be done by one or more of the collaboration applications participating in the session. For example, the collaboration application running on the collaboration device of the user that is monitoring the collaboration session in the background.

Upon determining the presence of an implicit or explicit trigger, the may notify the user at operation 7040. If the trigger was detected by the collaboration server, the collaboration server may notify the collaboration application of the user monitoring the collaboration session in the background and whose user was the target of the trigger. The collaboration device may then switch the active session, or prompt the user to switch the active session.

Figure 8:
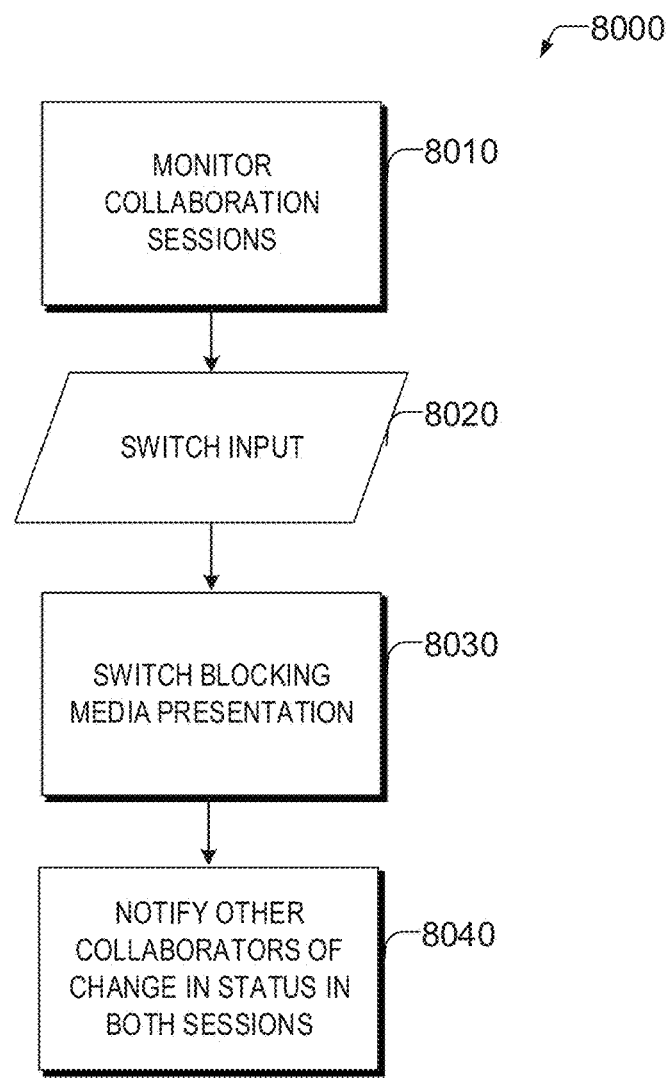
FIG. 8 shows a flowchart of a method of switching between an active collaboration session and a background collaboration session.

Turning now to FIG. 8, a flowchart of a method 8000 of switching between an active collaboration session and a background collaboration session is shown according to some examples of the present disclosure. At operation 8010, the collaboration device may monitor the collaboration sessions for an indication that the active session should be switched to a background session and a background session should be made the active session. This indication may be an indication received from the user, such as pressing a button in a GUI of the collaboration device or changing the input-focus from the active session GUI to the background session GUI. In other examples, where detection of a trigger automatically switches the active session, the indication may be the detection of a trigger or a receipt of an indication from the collaboration server of the detection of a trigger.

At operation 8020, the switch input is received. At operation 8030, the collaboration device switches the presentation of blocking media to that of the newly active session and begins converting or receiving converted blocking media (e.g., operation 6050 from FIG. 6) for blocking media of the old active (newly background) collaboration session. At operation 8040, the other collaboration devices for both the active and background sessions may be notified of the change so as to update any indicators such as a background status icon. In some examples, the collaboration device may notify other collaboration devices of the change in status of both sessions. In other examples, the collaboration server may notify other collaboration devices. For example, the collaboration server may track which collaboration sessions are background sessions and which collaboration session is active. Upon changing from active to background and from background to active, the collaboration session may update the appropriate sessions.

Figure 9:
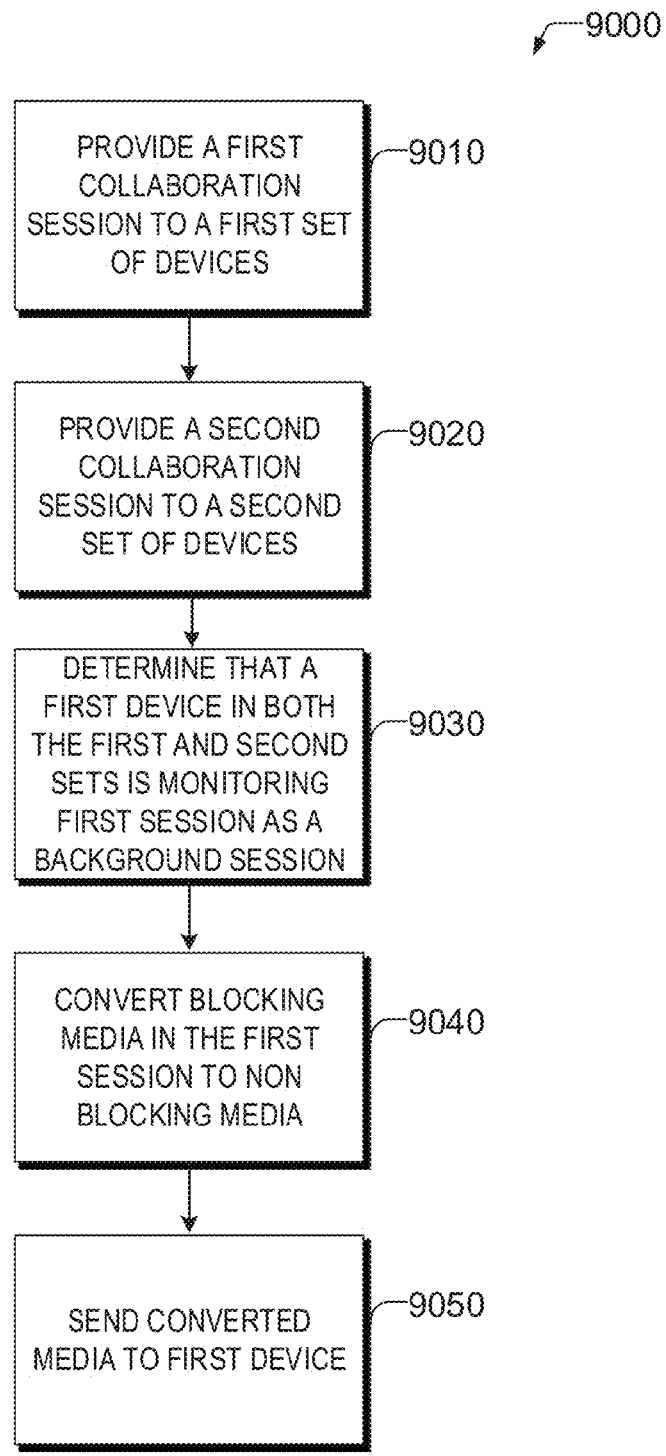
FIG. 9 shows a flowchart of a method of a collaboration server according to some examples of the present disclosure.

FIG. 9 illustrates a flowchart of a method 9000 of a collaboration server according to some examples of the present disclosure. At operation 9010 the collaboration server provides a first collaboration session to a first set of devices. This includes receiving blocking and non blocking media from collaborators of the first set of devices and sharing that media with other collaborators in the first set. At operation 9020 the collaboration server provides a second collaboration session to a second set of devices. This includes receiving blocking and non blocking media from collaborators of the second set of devices and sharing that media with other collaborators in the second set. The first and second sets of devices may be the same devices, may be completely different devices, or may have one or more common devices. In the example of FIG. 9, at operation 9030 the system determines that at least one device (a first device) is in both the first and second sets and is monitoring the first session as a background session. At operation 9040 the system, in response, converts the blocking media in the first session to non-blocking media as previously described. At operation 9050 the converted media from operation 9040 is sent to the first device.

Figure 10:
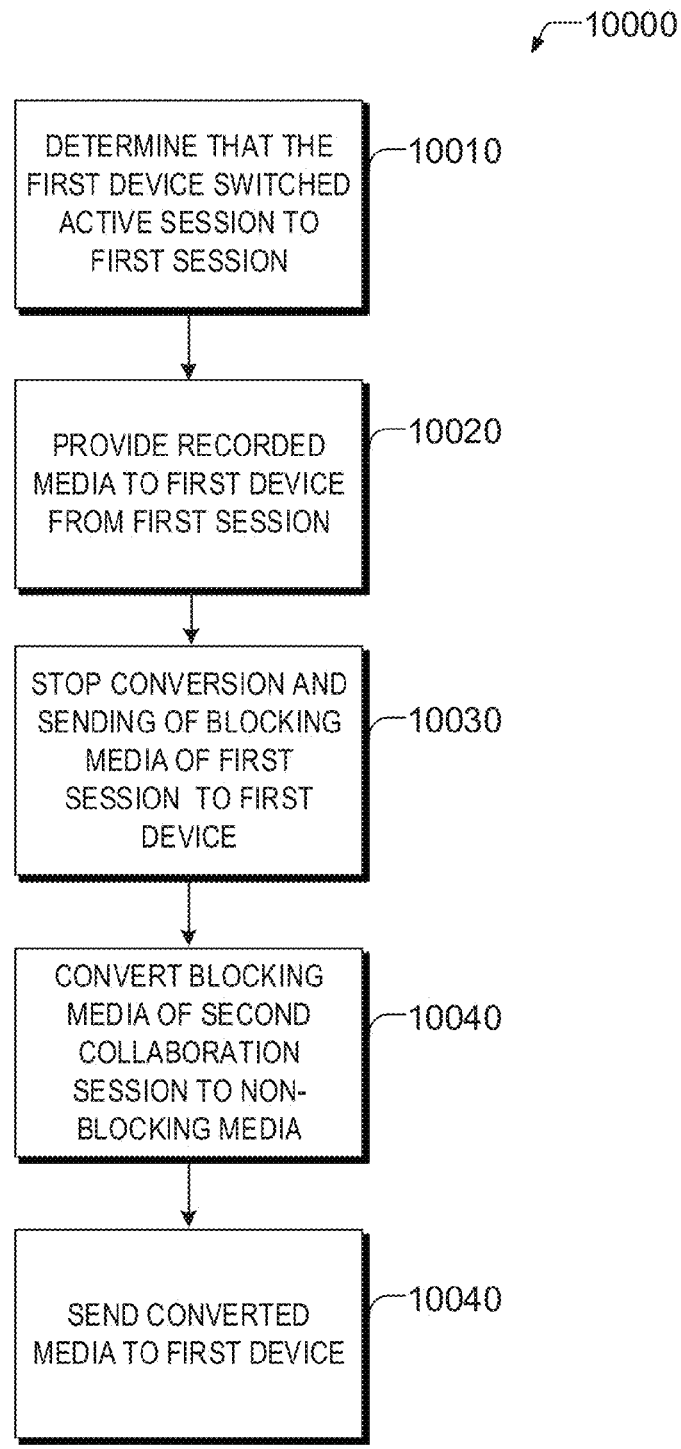
FIG. 10 shows a flowchart of a method of a collaboration server according to some examples of the present disclosure.

Turning now to FIG. 10, a flowchart of a method 10000 of a collaboration server according to some examples of the present disclosure is shown. FIG. 10 continues from FIG. 9 and shows a method of making a background session active. At operation 10010 the system determines that the first device switched its active session to the first session (from the second session). This may be the result of a message sent from the device, an automatic switch as a result of an indicator, or the like. At operation 10020, portions of the recorded blocking media may be provided to the first device from the first session. In some examples, this is only a predetermined amount of the latest recorded media (e.g., the latest 10 seconds of audio). In some examples, this media is not provided. In some examples, this media is only provided upon request from the device. At operation 10030 the conversion and sending of the blocking media of the first session to the first device is terminated. At operation 10040, the system begins converting blocking media of the second collaboration session to non-blocking media, which is sent to the device at operation 10050. In some examples, if another device is still monitoring the first session as a background session, the operation of 10030 only stops sending the converted media to the first device (but continues conversion and sending for other such devices). Similarly, if another device were already monitoring the second collaboration session as a background session, the system would already have started the conversion at operation 10040.

Figure 11:
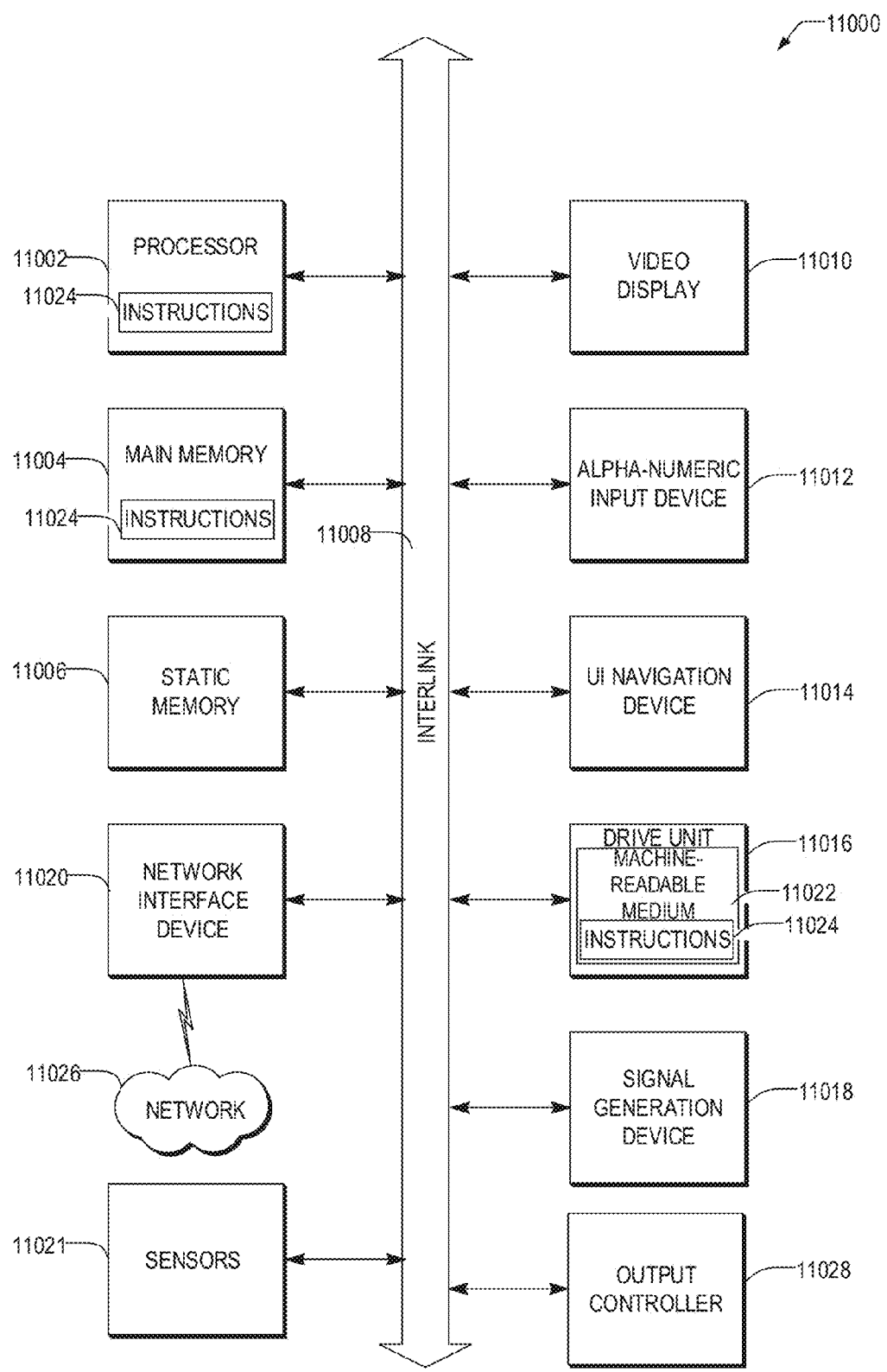
FIG. 11 is a block diagram illustrating an example of a machine upon which one or more embodiments may be implemented.

FIG. 11 illustrates a block diagram of an example machine 11000 upon which any one or more of the techniques (e.g., methodologies) discussed herein may be performed. In alternative embodiments, the machine 11000 may operate as a standalone device or may be connected (e.g., networked) to other machines. In a networked deployment, the machine 11000 may operate in the capacity of a server machine, a client machine, or both in server-client network environments. In an example, the machine 11000 may act as a peer machine in peer-to-peer (P2P) (or other distributed) network environment. The machine 11000 may be a collaboration device, computing device, collaboration server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor (e.g., computer processor, or processor) may be configured as respective different modules at different times. Software may accordingly configure a hardware processor, for example, to constitute a particular module at one instance of time and to constitute a different module at a different instance of time.

Machine (e.g., computer system) 11000 may include a hardware processor 11002 (e.g., a central processing unit (CPU), a graphics processing unit (GPU), a hardware processor core, or any combination thereof), a main memory 11004 and a static memory 11006, some or all of which may communicate with each other via an interlink (e.g., bus) 11008. The machine 11000 may further include a display unit 11010, an alphanumeric input device 11012 (e.g., a keyboard), and a user interface (UI) navigation device 11014 (e.g., a mouse). In an example, the display unit 11010, input device 11012 and UI navigation device 11014 may be a touch screen display. The machine 11000 may additionally include a storage device (e.g., drive unit) 11016, a signal generation device 11018 (e.g., a speaker), a network interface device 11020, and one or more sensors 11021, such as a global positioning system (GPS) sensor, compass, accelerometer, or other sensor. The machine 11000 may include an output controller 11028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 11016 may include a machine readable medium 11022 on which is stored one or more sets of data structures or instructions 11024 (e.g., software) embodying or utilized by any one or more of the techniques or functions described herein. The instructions 11024 may also reside, completely or at least partially, within the main memory 11004, within static memory 11006, or within the hardware processor 11002 during execution thereof by the machine 11000. In an example, one or any combination of the hardware processor 11002, the main memory 11004, the static memory 11006, or the storage device 11016 may constitute machine readable media.

While the machine readable medium 11022 is illustrated as a single medium, the term "machine readable medium" may include a single medium or multiple media (e.g., a centralized or distributed database, and/or associated caches and servers) configured to store the one or more instructions 11024.

The term "machine readable medium" may include any medium that is capable of storing, encoding, or carrying instructions for execution by the machine 11000 and that cause the machine 11000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 11024 may further be transmitted or received over a communications network 11026 using a transmission medium via the network interface device 11020. The Machine 11000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 11020 may include one or more physical jacks (e.g., Ethernet, coaxial, or phone jacks) or one or more antennas to connect to the communications network 11026. In an example, the network interface device 11020 may include a plurality of antennas to wirelessly communicate using at least one of single-input multiple-output (SIMO), multiple-input multiple-output (MIMO), or multiple-input single-output (MISO) techniques. In some examples, the network interface device 11020 may wirelessly communicate using Multiple User MIMO techniques.

Other Notes and Examples

Example 1 is a system for providing concurrent collaboration sessions, the system comprising: at least one processor communicatively coupled to memory; a network interface controller coupled to the at least one processor to enable connection over a network to a collaboration server; a collaboration module operable by the processor to control the connection to the at least one collaboration server, the collaboration module to identify that a first collaboration session is an active session and that a second collaboration session is a background session; and a presentation module operable by the processor and responsive to the simultaneous collaboration component determining that the first collaboration session is active, the presentation module to: present an item of blocking and an item of non-blocking media that corresponds to the first collaboration session in a Graphical User Interface (GUI) on a display device; and present a second item of non-blocking media that corresponds to the second collaboration session on the display device, the second item of non-blocking media comprising a conversion of a second item of blocking media to non-blocking media.

In Example 2, the subject matter of Example 1 optionally includes wherein the collaboration module is to receive the conversion of the second item of blocking media from the collaboration server.

In Example 3, the subject matter of any one or more of Examples 1-2 optionally include wherein the collaboration module is to: receive the second item of blocking media from the collaboration server; and wherein the collaboration module comprises a simultaneous collaboration module which is to: convert the second item of blocking media to non-blocking media.

In Example 4, the subject matter of any one or more of Examples 1-3 optionally include wherein the item of blocking media comprises audio and wherein the non-blocking media comprises one of: text, and images.

In Example 5, the subject matter of any one or more of Examples 1-4 optionally include wherein the collaboration module is to: receive an input to change the first collaboration session to be the background session and the second collaboration session to be the active session; responsive to the input, cause the presentation module to present the second item of non-blocking media and the second item of blocking media; and cause the presentation module to present the non-blocking item of media corresponding to the first collaboration session and present a third non-blocking media corresponding to a conversion of the second item of blocking media into non-blocking media.

In Example 6, the subject matter of any one or more of Examples 1-5 optionally include wherein the collaboration module is to: determine that a trigger in the second collaboration session occurred and responsive to the trigger, cause the presentation module to display a prompt on the display device notifying a user of the trigger.

In Example 7, the subject matter of Example 6 optionally includes wherein the trigger is a keyword spoken by a person in the second collaboration session.

In Example 8, the subject matter of Example 7 optionally includes wherein the keyword is detected by the collaboration server and wherein determining that a first trigger in the second collaboration session occurred comprises receiving a message from the collaboration server.

In Example 9, the subject matter of any one or more of Examples 7-8 optionally include wherein the collaboration module comprises a simultaneous collaboration module that detects the keyword, wherein the second item of non-blocking media comprises a transcript of audio corresponding to the second collaboration session, and wherein determining that a first trigger in the second collaboration session occurred comprises finding the keyword in the transcript of audio.

Example 10 is a non-transitory machine readable medium comprising instructions which when performed by a machine, causes the machine to perform operations comprising: using a computer processor: connecting over a network to a collaboration server and joining a first collaboration session; joining a second collaboration session; determining that the first collaboration session is an active session and the second collaboration session is a background session; and responsive to determining that the first collaboration session is active: presenting an item of blocking and an item of non-blocking media that corresponds to the first collaboration session in a Graphical User Interface (GUI) on a display device; and presenting a second item of non-blocking media that corresponds to the second collaboration session on the display device, the second item of non-blocking media comprising a conversion of a second item of blocking media to non-blocking media.

In Example 11, the subject matter of Example 10 optionally includes wherein the operations comprise: receiving the conversion of the second item of blocking media from the collaboration server.

In Example 12, the subject matter of any one or more of Examples 10-11 optionally include wherein the operations comprise: receiving the second item of blocking media from the collaboration server; and converting the second item of blocking media to non-blocking media.

In Example 13, the subject matter of any one or more of Examples 10-12 optionally include wherein the item of blocking media comprises audio and wherein the non-blocking media comprises one of: text, and images.

In Example 14, the subject matter of any one or more of Examples 10-13 optionally include wherein the operations comprise: receiving an input to change the first collaboration session to be the background session and the second collaboration session to be the active session; responsive to the input, presenting the second item of non-blocking media and the second item of blocking media; and presenting the non-blocking item of media corresponding to the first collaboration session and presenting a third non-blocking media corresponding to a conversion of the second item of blocking media into non-blocking media.

In Example 15, the subject matter of any one or more of Examples 10-14 optionally include wherein the operations comprise: determining that a trigger in the second collaboration session occurred and responsive to the trigger, displaying a prompt on the display device notifying a user of the trigger.

In Example 16, the subject matter of Example 15 optionally includes wherein the trigger is a keyword spoken by a person in the second collaboration session.

In Example 17, the subject matter of Example 16 optionally includes wherein the keyword is detected by the collaboration server and wherein determining that a first trigger in the second collaboration session occurred comprises receiving a message from the collaboration server.

In Example 18, the subject matter of any one or more of Examples 16-17 optionally include wherein the keyword is detected by the machine, wherein the second item of non-blocking media comprises a transcript of audio corresponding to the second collaboration session, and wherein determining that a first trigger in the second collaboration session occurred comprises finding the keyword in the transcript of audio.

Example 19 is a method for concurrent collaboration sessions comprising: using a computer processor: connecting over a network to a collaboration server and joining a first collaboration session; joining a second collaboration session; determining that the first collaboration session is an active session and the second collaboration session is a background session; and responsive to determining that the first collaboration session is active: presenting an item of blocking and an item of non-blocking media that corresponds to the first collaboration session in a Graphical User Interface (GUI) on a display device; and presenting a second item of non-blocking media that corresponds to the second collaboration session on the display device, the second item of non-blocking media comprising a conversion of a second item of blocking media to non-blocking media.

In Example 20, the subject matter of Example 19 optionally includes receiving the conversion of the second item of blocking media from the collaboration server.

In Example 21, the subject matter of any one or more of Examples 19-20 optionally include receiving the second item of blocking media from the collaboration server; and converting the second item of blocking media to non-blocking media.

In Example 22, the subject matter of any one or more of Examples 19-21 optionally include wherein the item of blocking media comprises audio and wherein the non-blocking media comprises one of: text, and images.

In Example 23, the subject matter of any one or more of Examples 19-22 optionally include receiving an input to change the first collaboration session to be the background session and the second collaboration session to be the active session; responsive to the input, presenting the second item of non-blocking media and the second item of blocking media; and presenting the non-blocking item of media corresponding to the first collaboration session and presenting a third non-blocking media corresponding to a conversion of the second item of blocking media into non-blocking media.

In Example 24, the subject matter of any one or more of Examples 19-23 optionally include determining that a trigger in the second collaboration session occurred and responsive to the trigger, displaying a prompt on the display device notifying a user of the trigger.

In Example 25, the subject matter of Example 24 optionally includes wherein the trigger is a keyword spoken by a person in the second collaboration session.

In Example 26, the subject matter of Example 25 optionally includes wherein the keyword is detected by the collaboration server and wherein determining that a first trigger in the second collaboration session occurred comprises receiving a message from the collaboration server.

In Example 27, the subject matter of any one or more of Examples 25-26 optionally include wherein the keyword is detected by the computer processor, wherein the second item of non-blocking media comprises a transcript of audio corresponding to the second collaboration session, and wherein determining that a first trigger in the second collaboration session occurred comprises finding the keyword in the transcript of audio.

Example 28 is a system for providing concurrent collaboration sessions, the system comprising: means for connecting over a network to a collaboration server and joining a first collaboration session; means for joining a second collaboration session; means for determining that the first collaboration session is an active session and the second collaboration session is a background session; and responsive to determining that the first collaboration session is active: means for presenting an item of blocking and an item of non-blocking media that corresponds to the first collaboration session in a Graphical User Interface (GUI) on a display device; and means for presenting a second item of non-blocking media that corresponds to the second collaboration session on the display device, the second item of non-blocking media comprising a conversion of a second item of blocking media to non-blocking media.

In Example 29, the subject matter of Example 28 optionally includes means for receiving the conversion of the second item of blocking media from the collaboration server.

In Example 30, the subject matter of any one or more of Examples 28-29 optionally include means for receiving the second item of blocking media from the collaboration server; and converting the second item of blocking media to non-blocking media.

In Example 31, the subject matter of any one or more of Examples 28-30 optionally include wherein the item of blocking media comprises audio and wherein the non-blocking media comprises one of: text, and images.

In Example 32, the subject matter of any one or more of Examples 28-31 optionally include means for receiving an input to change the first collaboration session to be the background session and the second collaboration session to be the active session; responsive to the input, means for presenting the second item of non-blocking media and the second item of blocking media; and means for presenting the non-blocking item of media corresponding to the first collaboration session and presenting a third non-blocking media corresponding to a conversion of the second item of blocking media into non-blocking media.

In Example 33, the subject matter of any one or more of Examples 28-32 optionally include means for determining that a trigger in the second collaboration session occurred and responsive to the trigger, displaying a prompt on the display device notifying a user of the trigger.

In Example 34, the subject matter of Example 33 optionally includes wherein the trigger is a keyword spoken by a person in the second collaboration session.

In Example 35, the subject matter of Example 34 optionally includes wherein the keyword is detected by the collaboration server and wherein determining that a first trigger in the second collaboration session occurred comprises receiving a message from the collaboration server.

In Example 36, the subject matter of any one or more of Examples 34-35 optionally include wherein the keyword is detected by a computer processor, wherein the second item of non-blocking media comprises a transcript of audio corresponding to the second collaboration session, and wherein determining that a first trigger in the second collaboration session occurred comprises finding the keyword in the transcript of audio.

Example 37 is a device comprising: at least one processor communicatively coupled to memory; a network interface controller coupled to the at least one processor to enable connection over a network to a plurality of collaboration devices; a collaboration module operable by the processor to provide a first collaboration session to a first set of the plurality of collaboration devices and to provide a second collaboration session to a second set of the plurality of collaboration devices; and a simultaneous collaboration module operable by the processor and responsive to the collaboration component determining that the first collaboration session is a background session for a first device, and in response convert blocking media in the first session to non-blocking media and send the non-blocking media to the first device.

In Example 38, the subject matter of Example 37 optionally includes wherein the blocking media is audio and the simultaneous collaboration module is to convert the audio into a text transcript.

In Example 39, the subject matter of any one or more of Examples 37-38 optionally include wherein the blocking media is video, and the simultaneous collaboration module is to convert the video into a sequence of still frames.

In Example 40, the subject matter of any one or more of Examples 37-39 optionally include wherein the simultaneous collaboration module is to store blocking media for the first session into a storage device.

In Example 41, the subject matter of Example 40 optionally includes wherein the collaboration module determines that a user of the first device has switched the first collaboration session to an active session, and in response, the simultaneous collaboration module is to provide the saved blocking media to the first device.

In Example 42, the subject matter of Example 41 optionally includes wherein the saved blocking media is a predetermined amount of the saved blocking media.

Example 43 is a machine readable medium, including instructions, which when performed by a machine, causes the machine to perform operations comprising: providing a first collaboration session to a first set of the plurality of collaboration devices; providing a second collaboration session to a second set of the plurality of collaboration devices; determining that the first collaboration session is a background session for a first device, and in response converting blocking media in the first session to non-blocking media; and sending the non-blocking media to the first device.

In Example 44, the subject matter of Example 43 optionally includes wherein the blocking media is audio and the operations of converting the blocking media in the first session to non-blocking media comprises converting the audio into a text transcript.

In Example 45, the subject matter of any one or more of Examples 43-44 optionally include wherein the blocking media is video, and the operations of converting the blocking media in the first session to non-blocking media comprises converting the video into a sequence of still frames.

In Example 46, the subject matter of any one or more of Examples 43-45 optionally include wherein the operations comprise storing blocking media for the first session into a storage device.

In Example 47, the subject matter of Example 46 optionally includes wherein the operations comprise determining that a user of the first device has switched the first collaboration session to an active session, and in response, providing the saved blocking media to the first device.

In Example 48, the subject matter of Example 47 optionally includes wherein the saved blocking media is a predetermined amount of the saved blocking media.

Example 49 is a method comprising: at a collaboration server, using one or more processors: providing a first collaboration session to a first set of the plurality of collaboration devices; providing a second collaboration session to a second set of the plurality of collaboration devices; determining that the first collaboration session is a background session for a first device, and in response converting blocking media in the first session to non-blocking media; and sending the non-blocking media to the first device.

In Example 50, the subject matter of Example 49 optionally includes wherein the blocking media is audio and converting the blocking media in the first session to non-blocking media comprises converting the audio into a text transcript.

In Example 51, the subject matter of any one or more of Examples 49-50 optionally include wherein the blocking media is video, and wherein converting the blocking media in the first session to non-blocking media comprises converting the video into a sequence of still frames.

In Example 52, the subject matter of any one or more of Examples 49-51 optionally include storing blocking media for the first session into a storage device.

In Example 53, the subject matter of Example 52 optionally includes determining that a user of the first device has switched the first collaboration session to an active session, and in response, providing the saved blocking media to the first device.

In Example 54, the subject matter of Example 53 optionally includes wherein the saved blocking media is a predetermined amount of the saved blocking media.

Example 55 is a device comprising: means for providing a first collaboration session to a first set of the plurality of collaboration devices; means for providing a second collaboration session to a second set of the plurality of collaboration devices; means for determining that the first collaboration session is a background session for a first device, and in response converting blocking media in the first session to non-blocking media; and means for sending the non-blocking media to the first device.

In Example 56, the subject matter of Example 55 optionally includes wherein the blocking media is audio and the means for converting the blocking media in the first session to non-blocking media comprises means for converting the audio into a text transcript.

In Example 57, the subject matter of any one or more of Examples 55-56 optionally include wherein the blocking media is video, and wherein means for converting the blocking media in the first session to non-blocking media comprises means for converting the video into a sequence of still frames.

In Example 58, the subject matter of any one or more of Examples 55-57 optionally include means for storing blocking media for the first session into a storage device.

In Example 59, the subject matter of Example 58 optionally includes means for determining that a user of the first device has switched the first collaboration session to an active session, and in response, means for providing the saved blocking media to the first device.

In Example 60, the subject matter of Example 59 optionally includes wherein the saved blocking media is a predetermined amount of the saved blocking media.

What is claimed is:

1. A system for providing concurrent collaboration sessions, the system comprising:
   a processor;
   a memory communicatively coupled to the processor and including instructions, which when performed by the processor, causes the system to perform operations comprising:
      connecting over a network to a collaboration server and joining a first collaboration session;
      joining a second collaboration session;
      determining that the first collaboration session is an active session and the second collaboration session is a background session; and
      responsive to determining that the first collaboration session is active:
         presenting an item of blocking and an item of non-blocking media that corresponds to the first collaboration session in a Graphical User Interface (GUI) on a display device; and
         presenting a second item of non-blocking media that corresponds to the second collaboration session on the display device, the second item of non-blocking media comprising a conversion of a second item of blocking media to non-blocking media.

2. The system of claim 1, wherein the operations comprise:
   receiving the conversion of the second item of blocking media from the collaboration server.

3. The system of claim 1, wherein the operations comprise:
   receiving the second item of blocking media from the collaboration server; and
   converting the second item of blocking media to non-blocking media.

4. The system of claim 1, wherein the item of blocking media comprises audio and wherein the non-blocking media comprises one of: text, and images.

5. The system of claim 1, wherein the operations comprise:
   receiving an input to change the first collaboration session to be the background session and the second collaboration session to be the active session;
   responsive to the input, presenting the second item of non-blocking media and the second item of blocking media; and
   presenting the non-blocking item of media corresponding to the first collaboration session and presenting a third non-blocking media corresponding to a conversion of the second item of blocking media into non-blocking media.

6. The system of claim 1, wherein the operations comprise:
   determining that a trigger in the second collaboration session occurred and responsive to the trigger, displaying a prompt on the display device notifying a user of the trigger.

7. The system of claim 6, wherein the trigger is a keyword spoken by a person in the second collaboration session.

8. The system of claim 7, wherein the keyword is detected by the collaboration server and wherein determining that a first trigger in the second collaboration session occurred comprises receiving a message from the collaboration server.

9. The system of claim 7, wherein the keyword is detected by the processor, wherein the second item of non-blocking media comprises a transcript of audio corresponding to the second collaboration session, and wherein determining that a first trigger in the second collaboration session occurred comprises finding the keyword in the transcript of audio.

10. A non-transitory machine readable medium comprising instructions which when performed by a machine, causes the machine to perform operations comprising:
using a computer processor:
connecting over a network to a collaboration server and joining a first collaboration session;
joining a second collaboration session;
determining that the first collaboration session is an active session and the second collaboration session is a background session; and
responsive to determining that the first collaboration session is active:
presenting an item of blocking and an item of non-blocking media that corresponds to the first collaboration session in a Graphical User Interface (GUI) on a display device; and
presenting a second item of non-blocking media that corresponds to the second collaboration session on the display device, the second item of non-blocking media comprising a conversion of a second item of blocking media to non-blocking media.

11. The non-transitory machine readable medium of claim 10, wherein the operations comprise:
receiving the conversion of the second item of blocking media from the collaboration server.

12. The non-transitory machine readable medium of claim 10, wherein the operations comprise:
receiving the second item of blocking media from the collaboration server; and
converting the second item of blocking media to non-blocking media.

13. The non-transitory machine readable medium of claim 10, wherein the item of blocking media comprises audio and wherein the non-blocking media comprises one of: text, and images.

14. The non-transitory machine readable medium of claim 10, wherein the operations comprise:
receiving an input to change the first collaboration session to be the background session and the second collaboration session to be the active session;
responsive to the input, presenting the second item of non-blocking media and the second item of blocking media; and
presenting the non-blocking item of media corresponding to the first collaboration session and presenting a third non-blocking media corresponding to a conversion of the second item of blocking media into non-blocking media.

15. The non-transitory machine readable medium of claim 10, wherein the operations comprise:
determining that a trigger in the second collaboration session occurred and responsive to the trigger, displaying a prompt on the display device notifying a user of the trigger.

16. The non-transitory machine readable medium of claim 15, wherein the trigger is a keyword spoken by a person in the second collaboration session.

17. The non-transitory machine readable medium of claim 16, wherein the keyword is detected by the collaboration server and wherein determining that a first trigger in the second collaboration session occurred comprises receiving a message from the collaboration server.

18. The non-transitory machine readable medium of claim 16, wherein the keyword is detected by the machine, wherein the second item of non-blocking media comprises a transcript of audio corresponding to the second collaboration session, and wherein determining that a first trigger in the second collaboration session occurred comprises finding the keyword in the transcript of audio.

19. A device comprising:
at least one processor communicatively coupled to memory;
a network interface controller coupled to the at least one processor to enable connection over a network to a plurality of collaboration devices;
a collaboration module operable by the processor to provide a first collaboration session to a first set of the plurality of collaboration devices and to provide a second collaboration session to a second set of the plurality of collaboration devices; and
a simultaneous collaboration module operable by the processor and responsive to the collaboration component determining that the first collaboration session is a background session for a first device, and in response convert blocking media in the first session to non-blocking media and send the non-blocking media to the first device.

20. The device of claim 19, wherein the blocking media is audio and the simultaneous collaboration module is to convert the audio into a text transcript.

21. The device of claim 19, wherein the blocking media is video, and the simultaneous collaboration module is to convert the video into a sequence of still frames.

22. The device of claim 19, wherein the simultaneous collaboration module is to store blocking media for the first session into a storage device.

23. The device of claim 22, wherein the collaboration module determines that a user of the first device has switched the first collaboration session to an active session, and in response, the simultaneous collaboration module is to provide the saved blocking media to the first device.

24. The device of claim 23, wherein the saved blocking media is a predetermined amount of the saved blocking media.

* * * * *